United States Patent
Lai et al.

(10) Patent No.: US 9,973,707 B2
(45) Date of Patent: May 15, 2018

(54) IMAGE PROCESSING METHOD AND APPARATUS AND SYSTEM FOR DYNAMICALLY ADJUSTING FRAME RATE

(71) Applicant: MEDIATEK INC., Hsin-Chu (TW)

(72) Inventors: Chun-Ming Lai, Hsinchu County (TW); Kuan-Hung Chou, New Taipei (TW); Chin-Chuan Liang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 56 days.

(21) Appl. No.: 15/088,101

(22) Filed: Mar. 31, 2016

(65) Prior Publication Data

US 2017/0032504 A1 Feb. 2, 2017

Related U.S. Application Data

(60) Provisional application No. 62/197,704, filed on Jul. 28, 2015.

(51) Int. Cl.
*G06K 9/40* (2006.01)
*H04N 5/235* (2006.01)
*H04N 19/587* (2014.01)
*G06T 3/40* (2006.01)

(52) U.S. Cl.
CPC ......... *H04N 5/2353* (2013.01); *G06T 3/4007* (2013.01); *H04N 19/587* (2014.11)

(58) Field of Classification Search
CPC ................ H04N 7/0127; H04N 19/146; G06T 2207/10016
See application file for complete search history.

(56) References Cited

U.S. PATENT DOCUMENTS

| 2004/0119847 A1* | 6/2004 | Kume | H04N 7/01 348/239 |
| 2004/0252230 A1* | 12/2004 | Winder | H04N 5/145 348/402.1 |
| 2012/0007963 A1* | 1/2012 | Matsumura | G03B 35/16 348/51 |
| 2012/0212663 A1* | 8/2012 | Takita | H04N 5/238 348/364 |

\* cited by examiner

*Primary Examiner* — Eueng-Nan Yeh
(74) *Attorney, Agent, or Firm* — Han IP Corporation; Andy M. Han (57) ABSTRACT

An image processing method is provided. The image processing method includes the following steps: detecting an input sequence of image frames captured using an image capturing device to generate a detection result; referring to the detection result to selectively perform frame interpolation on the input sequence of image frames to generate a to-be-encoded sequence of image frames; and encoding the to-be-encoded sequence of image frames to generate an encoded video signal.

23 Claims, 6 Drawing Sheets

IMAGE PROCESSING METHOD AND APPARATUS AND SYSTEM FOR DYNAMICALLY ADJUSTING FRAME RATE

CROSS REFERENCE TO RELATED APPLICATIONS

This application claims the benefit of U.S. provisional application No. 62/197,704, filed on Jul. 28, 2015, the contents of which are incorporated herein by reference.

BACKGROUND

The disclosed embodiments of the present invention relate to frame rate control, and more particularly, to an image processing method which detects an input sequence of image frames to selectively boost a frame rate thereof before an encoding stage, and related image processing apparatus and system.

When recording a video in a low-luminance environment, a conventional video recording apparatus extends an exposure time to obtain clear recorded contents. However, a long exposure time results in a decreased video frame rate. Upon playback of a low frame-rate video, a user sees a jerky playback and has an unpleasant experience.

Thus, there is a need for a novel image processing mechanism to provide a good user experience in a low-luminance environment.

SUMMARY

In accordance with exemplary embodiments of the present invention, an image processing method which detects an input sequence of image frames to selectively boost a frame rate thereof before an encoding stage, and a related image processing apparatus are proposed to solve the above-mentioned problems.

According to an embodiment of the present invention, an exemplary image processing method is disclosed. The exemplary image processing method comprises the following steps: detecting an input sequence of image frames captured using an image capturing device to generate a detection result; referring to the detection result to selectively perform frame interpolation on the input sequence of image frames to generate a to-be-encoded sequence of image frames; and encoding the to-be-encoded sequence of image frames to generate an encoded video signal.

According to an embodiment of the present invention, an exemplary image processing apparatus is disclosed. The exemplary image processing apparatus comprises a detection circuit, a frame interpolation circuit and a video encoder. The detection circuit arranged for detecting an input sequence of image frames captured using an image capturing device to generate a detection result. The frame interpolation circuit is coupled to the detection circuit, and is arranged for referring to the detection result to selectively perform frame interpolation on the input sequence of image frames to generate a to-be-encoded sequence of image frames. The video encoder is coupled to the frame interpolation circuit, and is arranged for encoding the to-be-encoded sequence of image frames to generate an encoded video signal.

According to an embodiment of the present invention, an exemplary image processing system is disclosed. The exemplary image processing system comprises an image processing apparatus and a storage device. The image processing apparatus is arranged for generating a to-be-encoded sequence of image frames by selectively performing frame interpolation on an input sequence of image frames to increase or maintain a frame rate of the input sequence of image frames, and encoding the to-be-encoded sequence of image frames to generate an encoded video signal. The storage device is coupled to the image processing apparatus, and is arranged for storing the encoded video signal.

The proposed image processing method and related image processing apparatus and image processing system may provide corresponding sequences of image frames for a video encoder in response to different encoding scenarios, thus providing smooth video playback and clear recorded contents in a low-luminance environment without utilizing a high sensitivity sensor. Accordingly, the manufacturing costs are greatly reduced.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

In some embodiments, an input sequence of image frames may be detected before it is encoded, and it can be determined whether to adjust the input sequence of image frames and thereby increase its frame rate. And the adjusted input sequence of image frames or the input sequence of image frames can be encoded. For example, when the input sequence of image frames meets a predetermined condition, e.g., having a frame rate or a luminance value not too low, the input sequence of image frames is not required to be adjusted and its frame rate can be maintained, and it may then be directly encoded. In contrast, when the input sequence of image frames does not meet a predetermined condition, the input sequence of image frames can be adjusted to have a modified (e.g., increased) frame rate, and the adjusted input sequence of image frames may then be encoded.

The proposed image processing mechanism may pre-process (e.g. detecting a frame rate and/or adjusting the frame rate for) a sequence of image frames to be encoded in advance, and then encode (or record) the pre-processed sequence of image frames to generate a video signal. By pre-processing the sequence of image frames inputted to a video encoder, the proposed image processing mechanism may provide corresponding sequences of image frames for the video encoder in different encoding scenarios (e.g. different video recording environment) such that the video encoder may have a smooth and clear video output. Further description is provided below.

Figure 1:
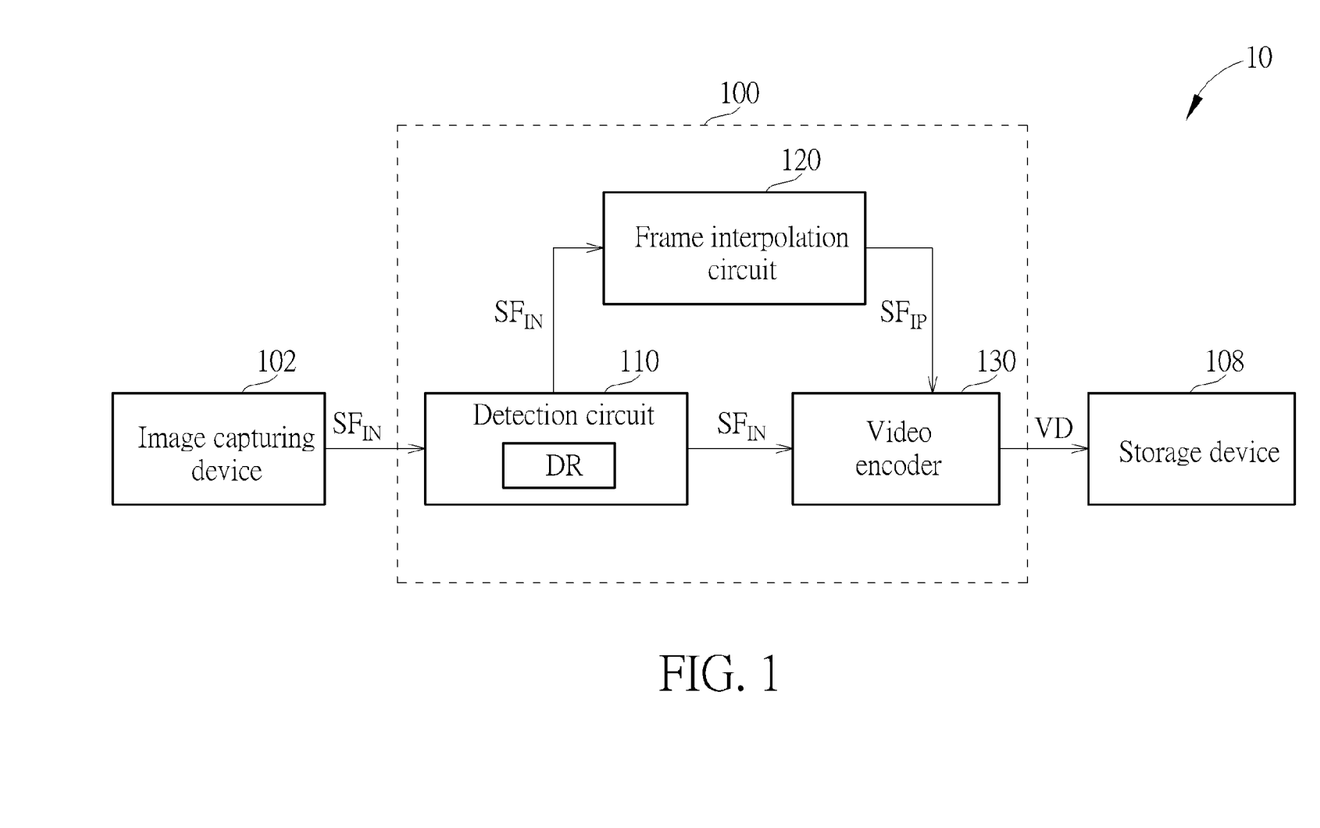
FIG. 1 is a diagram illustrating an exemplary image processing system according to an embodiment of the present invention.

Please refer to FIG. 1, which is a diagram illustrating an exemplary image processing system according to an embodiment of the present invention. The image processing system 10 may be implemented as a portable electronic device. The portable electronic device may be, for example, a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an Internet of things (IoT) device, or an Internet of everything (IoE) device. The image processing system 10 may include an image processing apparatus 100, an image capturing device 102 and a storage device 108, wherein the image processing apparatus 100 can be coupled between the image capturing device 102 and the storage device 108. The image processing apparatus 100 may encode an input sequence of image frames $SF_{IN}$ outputted from the image capturing device 102 to generate a encoded video signal VD, and store the encoded video signal VD in the storage device 108. Byway of example but not limitation, the image processing apparatus 100 may record the input sequence of image frames $SF_{IN}$ as a video (the encoded video signal VD), and store the recorded video in the storage device 108. When a playback circuit (not shown in FIG. 1) is used for playing the recorded video, the storage device 108 may provide the stored video for the playback circuit.

In this embodiment, the image processing apparatus 100 may pre-process a sequence of image frames to be encoded first and then encode the pre-processed sequence of image frames. Moreover, the image processing apparatus 100 can generate a to-be-encoded sequence of image frames by selectively performing frame interpolation on an input sequence of image frames $SF_{IN}$ to increase or maintain a frame rate of the input sequence of image frames, and encode the to-be-encoded sequence of image frames to generate an encoded video signal. Specifically, the image processing apparatus 100 may detect the input sequence of image frames $SF_{IN}$ and determine whether to adjust it and thereby increase or increase its frame rate. For example, when the input sequence of image frames $SF_{IN}$ meets a predetermined condition, the image processing apparatus 100 may not adjust the input sequence of image frames, maintain its frame rate, and it may then directly encode the image frames $SF_{IN}$. In contrast, when the input sequence of image frames $SF_{IN}$ does not meet a predetermined condition, the image processing apparatus 100 may adjust the input sequence of image frames, modify (e.g., increase) its frame rate, and it may then encode the adjusted image frames.

More specifically, in an embodiment illustrated in FIG. 1, the image processing apparatus 100 may include, but is not limited to, a detection circuit 110, a frame interpolation circuit 120 and a video encoder 130. The detection circuit 110 may detect the input sequence of image frames $SF_{IN}$ captured using the image capturing device 102 to generate a detection result DR. The frame interpolation circuit 120 is coupled to the detection circuit 110, and is arranged for referring to the detection result DR to selectively perform frame interpolation on the input sequence of image frames $SF_{IN}$ to generate a to-be-encoded sequence of image frames inputted to the video encoder 130 (an interpolated sequence of image frames $SF_{IP}$). In a case, when the detection result DR indicates that it is required to perform the frame interpolation on the input sequence of image frames $SF_{IN}$ (e.g. a frame rate of the input sequence of image frames $SF_{IN}$ is less than a predetermined threshold), the frame interpolation circuit 120 may perform the frame interpolation on the input sequence of image frames $SF_{IN}$ to generate the interpolated sequence of image frames $SF_{IP}$ as the to-be-encoded sequence of image frames inputted to the video encoder 130. The interpolated sequence of image frames $SF_{IP}$ has an increased frame rate. Specifically, the interpolated sequence of image frames $SF_{IP}$ may include the input sequence of image frames $SF_{IN}$ and an additional sequence of image frames generated by the frame interpolation, wherein image frames of the additional sequence of image frames are interpolated between image frames of the input sequence of image frames $SF_{IN}$. Next, the video encoder 130 may encode the to-be-encoded sequence of image frames to generate the encoded video signal VD). It is noted that the disclosure is not limited to providing the interpolated sequence of image frames $SF_{IP}$ by the frame interpolation circuit 120. In another embodiment, the frame interpolation circuit 120 may perform the frame interpolation on the input sequence of image frames $SF_{IN}$ to an additional sequence of image frames. And the frame interpolation circuit 120 can provide the additional sequence of image frames and the frame rate decoder may provide the input sequence of image frames $SF_{IN}$ in an appropriate order to the video encoder 130.

In another case, when the detection result DR indicates that it is unrequired to perform the frame interpolation on the input sequence of image frames $SF_{IN}$ (e.g. a frame rate of the input sequence of image frames $SF_{IN}$ is not less than a predetermined threshold), the detection circuit 110 may provide the video encoder 130 with the input sequence of image frames $SF_{IN}$ used as the to-be-encoded sequence of image frames. In other words, the frame interpolation circuit 120 may not perform the frame interpolation on the input sequence of image frames $SF_{IN}$, and the video encoder 130 may encode the input sequence of image frames $SF_{IN}$ directly to generate the encoded video signal VD.

Additionally, in this embodiment, the image capturing device 102 may be implemented by any devices capable of capturing images (e.g. an image sensor), and the storage device 108 may be implemented by any devices capable of storing data (e.g. a memory or a register). In one embodiment, the image capturing device 102 may further include an image signal processor (ISP) (not shown in FIG. 1), which is arranged for optimizing image quality (e.g. adjusting a luminance/brightness, contrast and/or color saturation). In other words, the image frames of the input sequence of image frames SF.sub.IN may be image frames which have undergone optimization processing.

In view of the above, by pre-processing (e.g. adjusting a frame rate thereof) the input sequence of image frames $SF_{IN}$ outputted from the image capturing device 102, the image processing apparatus 100 may provide corresponding sequences of image frames for the video encoder 130 in response to different encoding scenarios, thereby outputting the high-quality encoded video signal VD.

Figure 2:
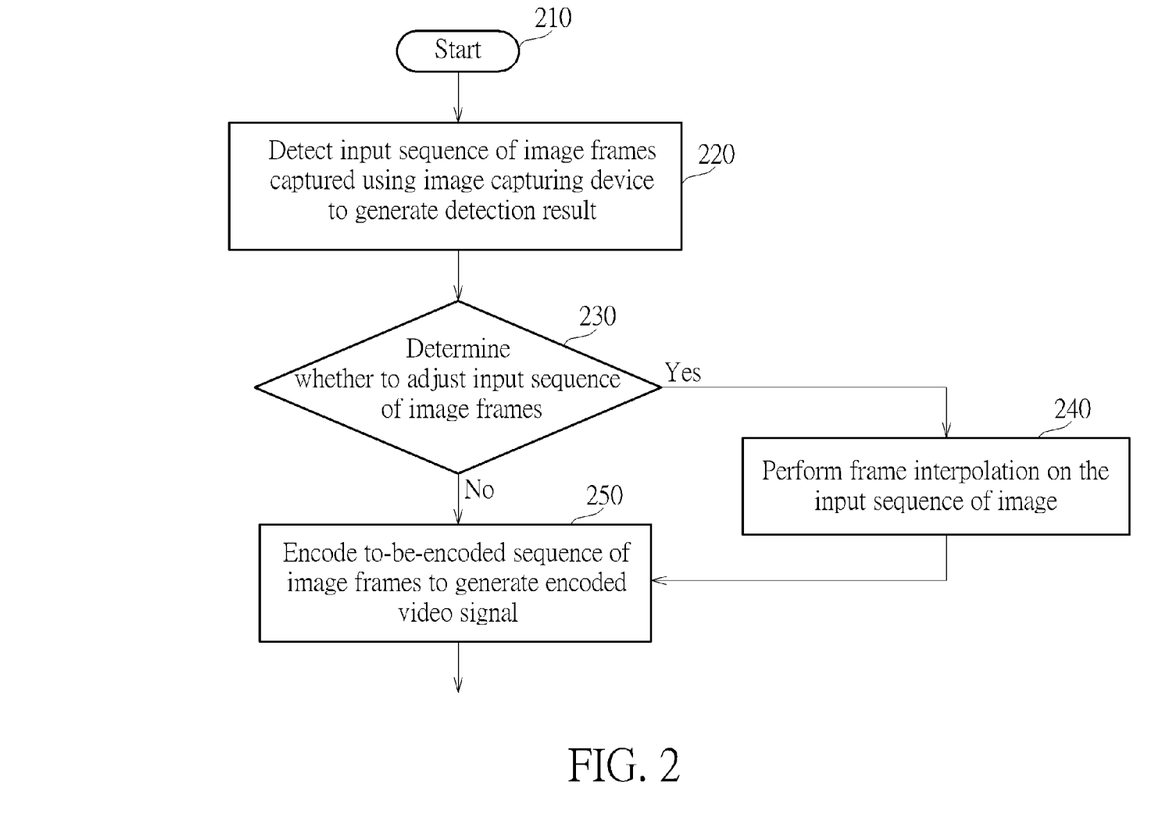
FIG. 2 is a flowchart of an exemplary image processing method according to an embodiment of the present invention.

The image processing mechanism employed in the image processing apparatus 100 may be summarized in the flow chart shown in FIG. 2. Please refer to FIG. 2 in conjunction with FIG. 1. FIG. 2 is a flow chart of an exemplary image processing method according to an embodiment of the present invention. For illustrative purposes, the method shown in FIG. 2 is described with reference to the image processing apparatus 100 shown in FIG. 1. One skilled in the art should understand that the method shown in FIG. 2 is not limited to being employed in the image processing apparatus 100 shown in FIG. 1. In addition, provided that the result is substantially the same, the steps are not required to be executed in the exact order shown in FIG. 2 and are not required to be contiguous. In other words, other steps can be intermediate. The method may be summarized as below.

Step 210: Start. For example, the image capturing device 102 may capture a scene to be recorded to generate the input sequence of image frames $SF_{IN}$.

Step 220: The detection circuit 110 detects the input sequence of image frames $SF_{IN}$ captured using the image capturing device 102 to generate the detection result DR accordingly.

Step 230: The detection circuit 110 refers to the detection result DR to determine whether to adjust the input sequence of image frames $SF_{IN}$. When it is determined that it is required to adjust the input sequence of image frames $SF_{IN}$, go to step 240, otherwise go to step 250.

Step 240: The frame interpolation circuit 120 performs frame interpolation on the input sequence of image frames $SF_{IN}$ to generate a to-be-encoded sequence of image frames (the interpolated sequence of image frames $SF_{IP}$), wherein the to-be-encoded sequence of image frames has an increased frame rate. Specifically, the to-be-encoded sequence $SF_{IP}$ of image frames includes the input sequence of image frames $SF_{IN}$ and an additional sequence of image frames generated by the frame interpolation.

Step 250: The video encoder 130 encodes the to-be-encoded sequence of image frames to generate the encoded video signal VD, wherein in a case where the detection result DR indicates that it is unrequired to adjust the input sequence of image frames $SF_{IN}$, the detection circuit 110 may transmit the input sequence of image frames $SF_{IN}$ to the video encoder 130 directly such that the input sequence of image frames $SF_{IN}$ is provided as the to-be-encoded sequence of image frames.

In one embodiment, the detection circuit 110 may directly detect a frame rate of the input sequence of image frames $SF_{IN}$ to generate the detection result DR (step 220), and refer to the detection result DR (including the frame rate of the input sequence of image frames $SF_{IN}$) to determine whether to adjust the input sequence of image frames $SF_{IN}$ (step 230) to increase a frame rate thereof. For example, when the detection result DR indicates that the frame rate of the input sequence of image frames $SF_{IN}$ is less than a predetermined threshold, the detection circuit 110 may enable the frame interpolation circuit 120 to perform the frame interpolation to increase the frame rate. In another example, when the detection result DR indicates that the frame rate of the input sequence of image frames $SF_{IN}$ is not less than a predetermined threshold, the detection circuit 110 may provide the input sequence of image frames $SF_{IN}$ for the video encoder 130 directly.

In another embodiment, the detection circuit 110 may detect the frame rate of the input sequence of image frames $SF_{IN}$ in an indirect manner to generate the detection result DR (step 220), and refer to the detection result DR to determine whether to adjust the input sequence of image frames $SF_{IN}$ (step 230). For example, the detection circuit 110 may detect an exposure time of the image capturing device 102 to thereby determine the frame rate of the input sequence of image frames $SF_{IN}$, and generate the detection result DR accordingly. Next, the detection circuit 110 may refer to the exposure time indicated by the detection result DR to determine whether to adjust the input sequence of image frames $SF_{IN}$.

In yet another embodiment, the detection circuit 110 may detect a luminance/brightness of the input sequence of image frames $SF_{IN}$ to generate the detection result DR (step 220), and refer to the detection result DR to determine whether to adjust the input sequence of image frames $SF_{IN}$ (step 230). For example, when the detection result DR indicates that the luminance of the input sequence of image frames $SF_{IN}$ is less than a predetermined threshold, this means that the image capturing device 102 may extend the exposure time to enhance the image luminance. As the extension of exposure time causes a decreased frame rate, the detection circuit 110 may enable the frame interpolation circuit 120 to perform the frame interpolation to increase the frame rate. In another example, when the detection result DR indicates that the luminance of the input sequence of image frames $SF_{IN}$ is not less than a predetermined threshold, this means that there is sufficient brightness in the environment. Hence, the detection circuit 110 need not enable the frame interpolation circuit 120 to perform the frame interpolation, and the input sequence of image frames $SF_{IN}$ is provided for the video encoder 130 directly.

For better understanding of the present invention, an image processing apparatus detecting a frame rate of a sequence of image frames to generate a detection result is given in the following for further description of the proposed image processing mechanism. However, this is not meant to be a limitation of the present invention. Please refer to FIG. 3, which is an implementation of the image processing system 10 shown in FIG. 1. In this implementation, the image processing system 30 may include the image capturing device 102 and the storage device 108 shown in FIG. 1 and an image processing apparatus 300, wherein the image processing apparatus 300 may include the frame interpolation circuit 120 and the video encoder 130 shown in FIG. 1 and a detection circuit 310. The detection circuit 110 shown in FIG. 1 may be implemented by the detection circuit 310 which includes a frame rate detector 312, wherein the frame rate detector 312 may detect a frame rate of the input sequence of image frames $SF_{IN}$ to generate a detection result FR. Specifically, the detection circuit 310 may detect the input sequence of image frames $SF_{IN}$ to generate the detection result FR which indicates the frame rate of the input sequence of image frames $SF_{IN}$.

Figure 3:
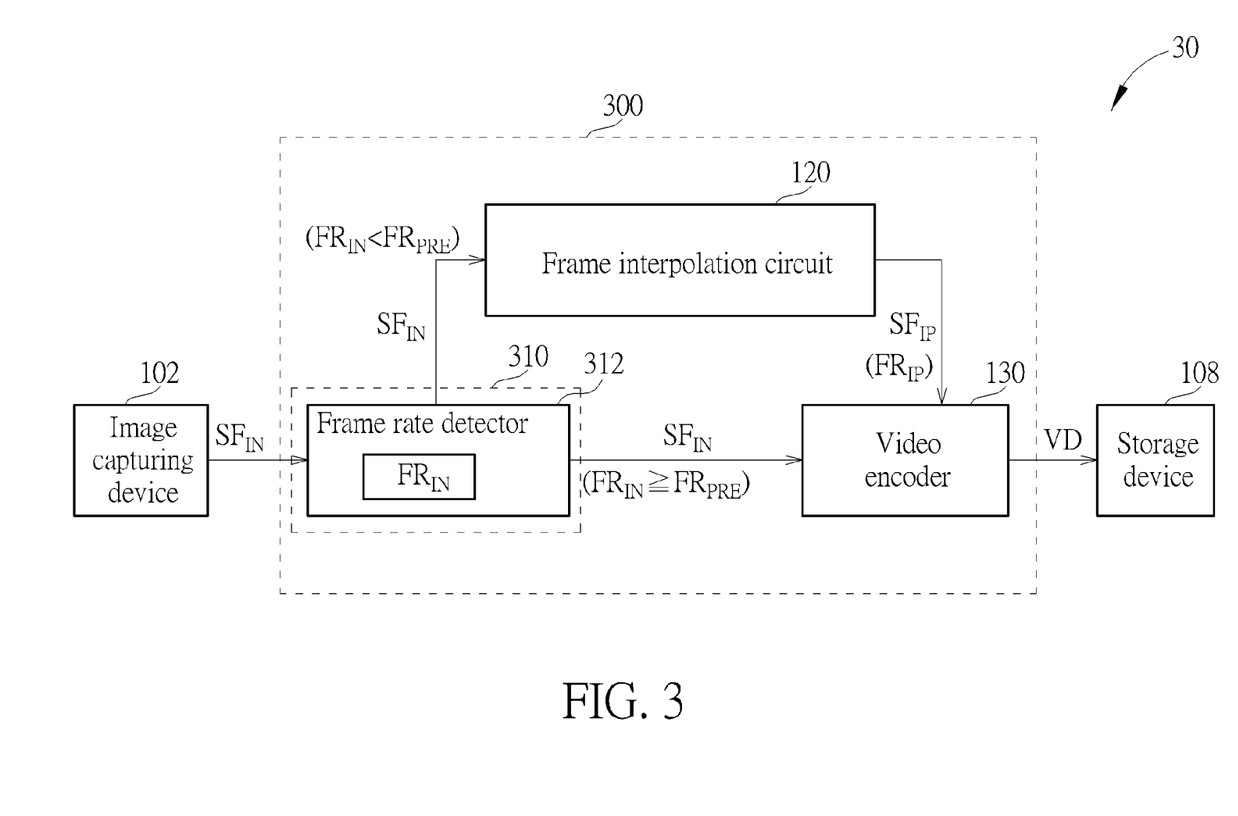
FIG. 3 is an implementation of the image processing system shown in FIG. 1.

For example, in a case where the image processing system 30 records a video in one operating scenario (e.g. in a low-luminance environment) such that the image capturing device 102 extends an exposure time thereof, the frame interpolation circuit 120 may perform frame interpolation on the input sequence of image frames $SF_{IN}$ to generate a to-be-encoded sequence of image frames (i.e. the interpolated sequence of image frames $SF_{IP}$ when the detection result FR indicates that a frame rate $FR_{IN}$ of the input sequence of image frames $SF_{IN}$ is less than a predetermined threshold $FR_{PRE}$, wherein a frame rate $FR_{IP}$ of the interpolated sequence of image frames $SF_{IN}$ is not less than the predetermined threshold $FR_{PRE}$. In other words, the frame interpolation circuit 120 may increase the frame rate $FR_{IN}$ of the input sequence of image frames $SF_{IN}$.

In another example, in a case where the image processing system records a video in another operating scenario, the frame interpolation circuit 120 may not perform the frame interpolation (e.g. the frame interpolation circuit 120 is not activated) when the detection result FR indicates that the frame rate $FR_{IN}$ of the input sequence of image frames $SF_{IN}$ is not less than the predetermined threshold $FR_{PRE}$, wherein the input sequence of image frames $SF_{IN}$ is directly provided as the to-be-encoded sequence of image frames of the video encoder 130.

Figure 4:
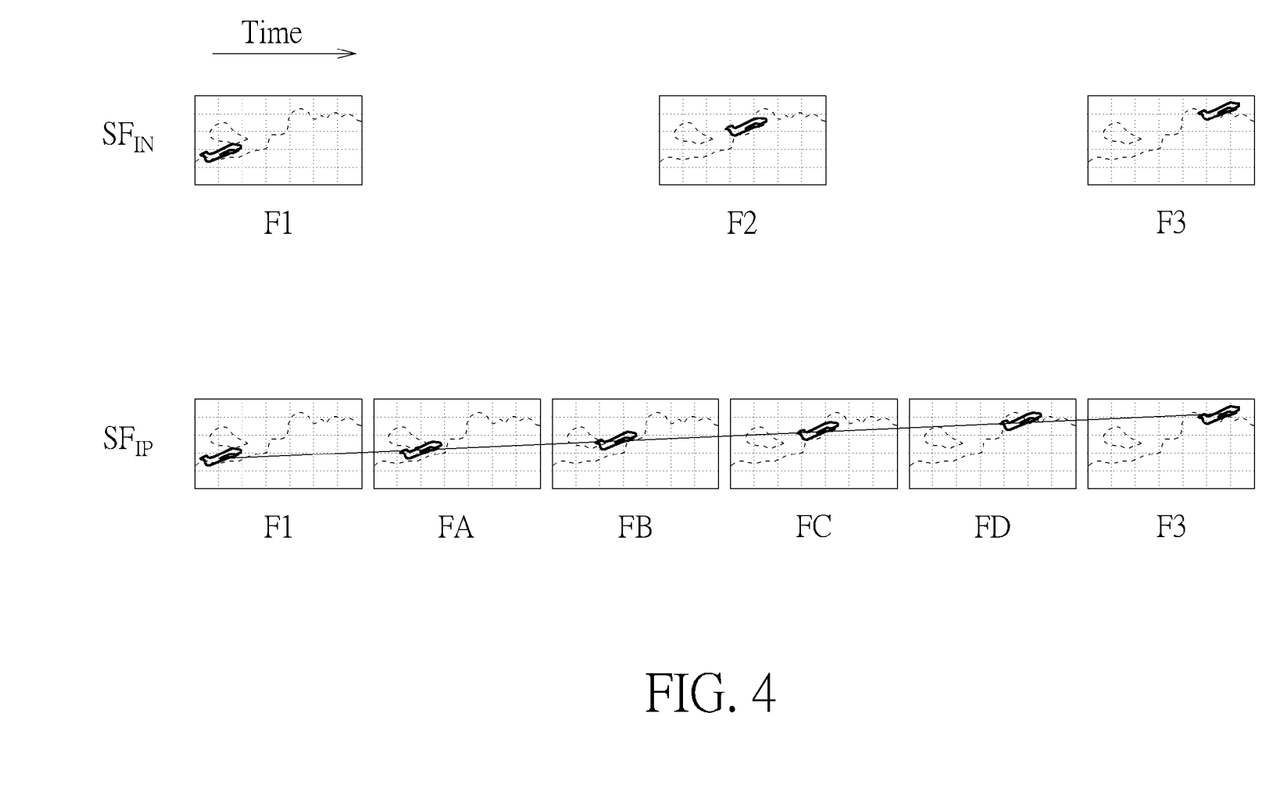
FIG. 4 illustrates exemplary frame interpolation performed by the frame interpolation circuit shown in FIG. 3 according to an embodiment of the present invention.

FIG. 4 illustrates exemplary frame interpolation performed by the frame interpolation circuit 120 shown in FIG. 3 according to an embodiment of the present invention. In this embodiment, the frame interpolation circuit 120 may interpolate a plurality of image frames FA-FD between a plurality of image frames F1 and F2 of the input sequence of image frames $SF_{IN}$. For example, the frame interpolation circuit 120 may perform motion analysis on the input sequence of image frames $SF_{IN}$ to generate a motion analysis result, and refer to the detection result and the motion analysis result of the input sequence of image frames $SF_{IN}$ to perform the frame interpolation (and/or motion compensation) to generate the interpolated sequence of image frames $SF_{IP}$. Please note that the frame interpolation shown in FIG. 4 is for illustrative purposes only and is not meant to be a limitation of the present invention. Other frame interpolation techniques also fall within the scope of the present invention.

In other embodiments, it is possible to detect luminance of a sequence of image frames to generate a detection result. Please refer to FIG. 5, which is another implementation of the image processing system 10 shown in FIG. 1. In this implementation, the image processing system 50 may include the storage device 108 shown in FIG. 1, an image processing apparatus 500 and an image capturing device 502, wherein the image processing apparatus 100 and the image capturing device 102 shown in FIG. 1 may be implemented by the image processing apparatus 500 and the image capturing device 502 respectively. The image processing apparatus 500 may include the video encoder 130 shown in FIG. 1, a detection circuit 510 and a frame interpolation circuit 520. The detection circuit 110 and the frame interpolation circuit 120 shown in FIG. 1 may be implemented by the detection circuit 510 and the frame interpolation circuit 520 respectively. The detection circuit 510 includes an exposure detector 516, which may detect a luminance (or brightness) of the input sequence of image frames $SF_{IN}$ to generate a detection result LU. Specifically, the detection circuit 510 may detect the input sequence of image frames $SF_{IN}$ to generate the detection result LU which indicates the luminance of the input sequence of image frames $SF_{IN}$.

Figure 5:
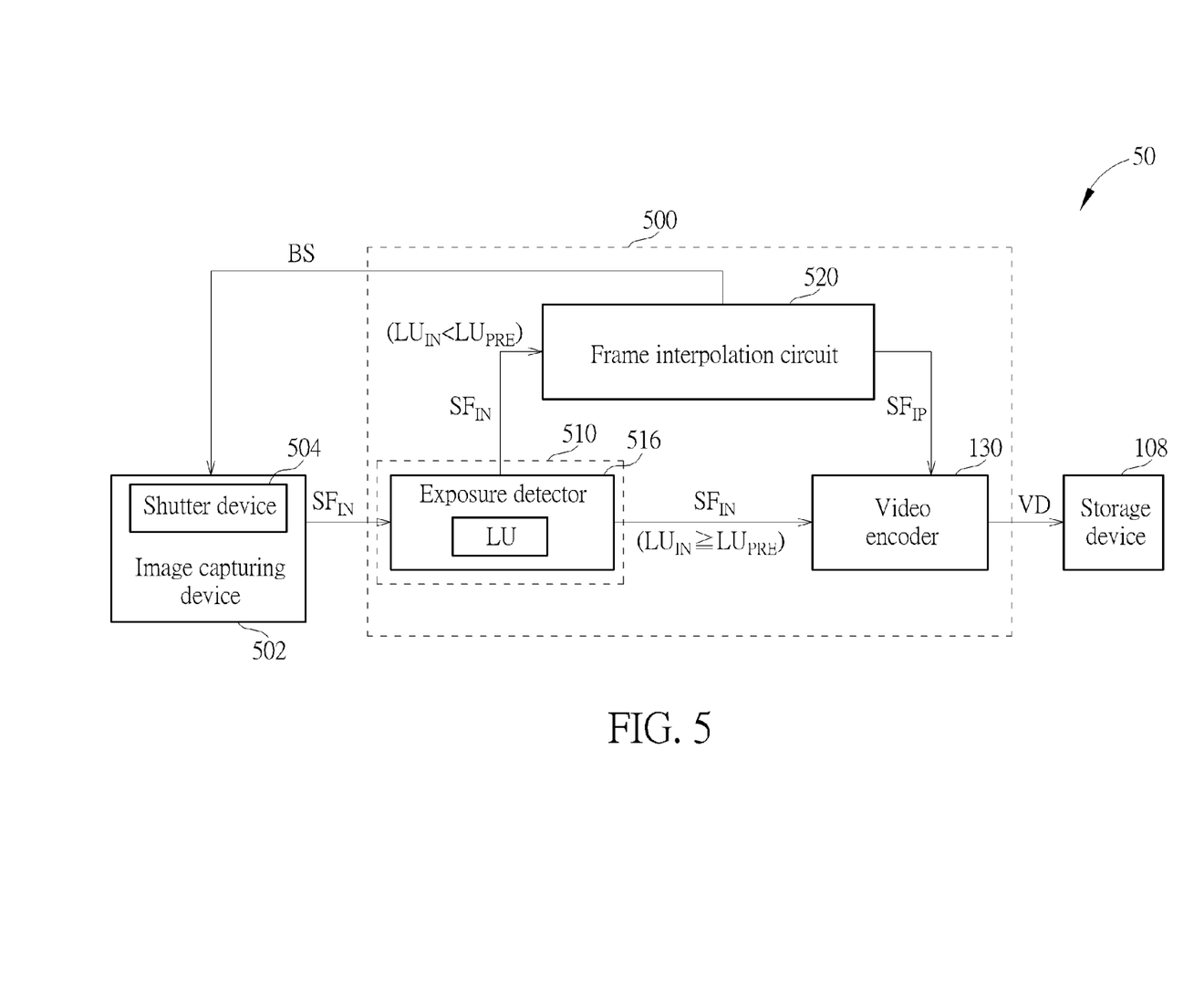
FIG. 5 is another implementation of the image processing system shown in FIG. 1.

In this embodiment, in a case where the image processing system 50 records a video in one operating scenario (e.g. in a low-luminance environment), the image capturing device 502 may adjust exposure settings (e.g. an exposure time or an exposure level) to enhance a luminance of a captured image. For example, when the detection result LU indicates that a frame rate $LU_{IN}$ of the input sequence of image frames $SF_{IN}$ is less than a predetermined threshold $LU_{PRE}$, the image capturing device 502 may extend an exposure time thereof to enhance the luminance of the captured image, resulting in a decreased frame rate of the input sequence of image frames $SF_{IN}$. In order to maintain image quality of the encoded video signal VD, the frame interpolation circuit 520 may perform frame interpolation on the input sequence of image frames $SF_{IN}$ to generate a to-be-encoded sequence of image frames (i.e. the interpolated sequence of image frames $SF_{IP}$), wherein a frame rate of the interpolated sequence of image frames $SF_{IP}$ is greater than the frame rate of the input sequence of image frames $SF_{IN}$. Hence, the image processing system 50 may generate an encoded video signal having a sufficient luminance and provide smooth video playback.

In another example, in a case where the image processing system 50 records a video in another operating scenario (e.g. in a bright environment), the frame interpolation circuit 520 may not perform the frame interpolation (e.g. the frame interpolation circuit 520 is not activated) when the detection result LU indicates that the luminance $LU_{IN}$ of the input sequence of image frames $SF_{IN}$ is not less than the predetermined threshold $LU_{PRE}$, wherein the input sequence of image frames $SF_{IN}$ is directly provided as the to-be-encoded sequence of image frames of the video encoder 130. As a person skilled in the art should readily understand the operations of the image processing apparatus 500 (e.g. image pre-processing and frame interpolation) after reading paragraphs directed to FIGS. 1-4, similar description is not repeated here for brevity.

It should be noted that when the detection result LU indicates that the luminance LU of the input sequence of image frames $SF_{IN}$ is less than the predetermined threshold $LU_{PRE}$, the image processing apparatus 500 may further control the image capturing device 502 to adjust a shutter speed (or an exposure time). By way of example but not limitation, when the detection result LU indicates that the luminance LU of the input sequence of image frames $SF_{IN}$ is less than the predetermined threshold $LU_{PRE}$, the frame interpolation circuit 520 may further generates a feedback signal BS for controlling a shutter device 504 in the image capturing device 502 to decrease a shutter speed (i.e. extending an exposure time). As the image processing apparatus 500 may dynamically adjust the shutter speed to thereby enhance image quality, the image processing system 50 may realize high quality video recording without utilizing a high sensitivity sensor. In brief, the proposed image processing mechanism may not only dynamically adjust a frame rate to provide smooth video playback, but also adjust a shutter speed or other settings for capturing images in the image capturing device 504 according to a detection result of a sequence of image frames to thereby enhance video recording quality.

The proposed image apparatus may determine whether to adjust an input sequence of image frames captured using an image capturing device according to a detection result indicating one or more of a frame rate, a luminance and other image information of the input sequence of image frames. Please refer to FIG. 6, which is another implementation of the image processing system 10 shown in FIG. 1. In this implementation, the image processing system 60 may include the storage device 108 shown in FIG. 1, the image capturing device 502 shown in FIG. 5 and an image processing apparatus 600, wherein the image processing apparatus 100 and the image capturing device 102 shown in FIG. 1 may be implemented by the image processing apparatus 600 and the image capturing device 502 respectively. The image processing apparatus 600 may include the video encoder 130 shown in FIG. 1, a detection circuit 610 and a frame interpolation circuit 620. The detection circuit 110 and the frame interpolation circuit 120 shown in FIG. 1 may be implemented by the detection circuit 610 and the frame interpolation circuit 620 respectively. The detection circuit 610 may detect the input sequence of image frames $SF_{IN}$ to generate the detection result DR, wherein the detection result DR may include a frame rate and a luminance of the input sequence of image frames $SF_{IN}$.

Figure 6:
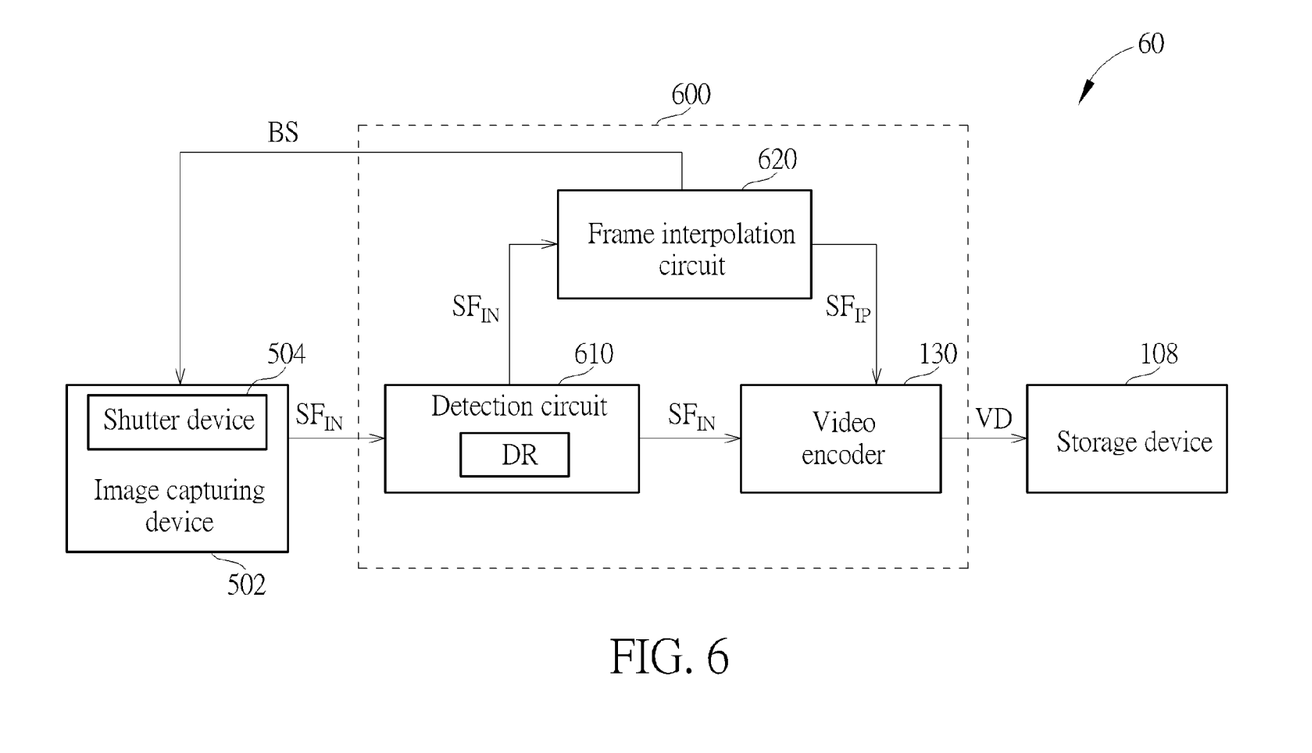
FIG. 6 is another implementation of the image processing system shown in FIG. 1.

In this embodiment, in one case, when the detection result DR indicates that the frame rate of the input sequence of image frames $SF_{IN}$ is less than a first predetermined threshold and that the luminance of the input sequence of image frames $SF_{IN}$ is less than a second predetermined threshold, this means that the image capturing device 502 may extend an exposure time to reduce the frame rate the input sequence of image frames $SF_{IN}$ even if the frame rate is already low. In order to maintain image quality of the encoded video signal VD, the frame interpolation circuit 620 may perform frame interpolation on the input sequence of image frames $SF_{IN}$ to generate a to-be-encoded sequence of image frames (i.e. the interpolated sequence of image frames $SF_{IP}$), wherein a frame rate of the interpolated sequence of image frames $SF_{IP}$ is greater than the frame rate of the input sequence of image frames $SF_{IN}$. Hence, the image processing system 60 may generate an encoded video signal having a sufficient luminance and provide smooth video playback. In another case, when the detection result DR indicates that the frame rate of the input sequence of image frames $SF_{IN}$ is not less than the first predetermined threshold and that the luminance of the input sequence of image frames $SF_{IN}$ is not less than the second predetermined threshold, the frame interpolation circuit 620 may not perform the frame interpolation (e.g. the frame interpolation circuit 620 is not activated), wherein the input sequence of image frames $SF_{IN}$ is directly provided as the to-be-encoded sequence of image frames of the video encoder 130.

It is noted that in different embodiments, the conditions for determining whether to increase the frame rate of an input sequence of image frames $SF_{IN}$ may be different. For example, in one embodiment, when the detection result DR indicates that the frame rate of the input sequence of image frames $SF_{IN}$ is less than a first predetermined threshold or that the luminance of the input sequence of image frames $SF_{IN}$ is less than a second predetermined threshold, the frame interpolation circuit 620 may perform frame interpolation on the input sequence of image frames $SF_{IN}$ to generate a to-be-encoded sequence of image frames.

It should be noted that the image processing apparatus 600 may refer to only one of the frame rate detection result and the luminance detection result included in the detection result DR to selectively perform the frame interpolation (i.e. the image processing mechanism shown in FIG. 3 and the image processing mechanism shown in FIG. 5). Further, similar to the operation of the image processing apparatus 500, the image processing apparatus 600 may further generate the feedback signal BS to the image capturing device 502, and the shutter device 504 may decrease the shutter speed (i.e. extending the exposure time) according to the feedback signal BS. As a person skilled in the art should readily understand the operations of the image processing apparatus 600 after reading paragraphs directed to FIGS. 1-5, further description is not omitted here for brevity.

To sum up, the proposed image processing method and related image processing apparatus may provide corresponding sequences of image frames for a video encoder in response to different encoding scenarios, thus providing smooth video playback and clear recorded contents in a low-luminance environment without utilizing a high sensitivity sensor. Accordingly, the manufacturing costs are greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
   detecting, by a detection circuit, an input sequence of image frames captured using an image capturing device to generate a detection result indicating whether or not to perform frame interpolation on the input sequence of image frames, the detection circuit capable of generating the detection result based on an exposure time of the image capturing device;
   referring to the detection result to selectively perform the frame interpolation on the input sequence of image frames to generate a to-be-encoded sequence of image frames; and
   encoding the to-be-encoded sequence of image frames to generate an encoded video signal,
   wherein the detection result comprises a luminance of the input sequence of image frames, and
   wherein when the detection result indicates that the luminance is less than a predetermined threshold, the step of performing the frame interpolation on the input sequence of image frames to generate the to-be-encoded sequence of image frames is performed.

2. The image processing method of claim 1, wherein when the frame interpolation on the input sequence of image frames is not performed, the input sequence of image frames is provided as the to-be-encoded sequence of image frames.

3. The image processing method of claim 1, wherein when the frame interpolation on the input sequence of image frames is performed, the to-be-encoded sequence of image frames comprises the input sequence of image frames and an additional sequence of image frames generated by the frame interpolation.

4. The image processing method of claim 1, wherein the detection result comprises a frame rate of the input sequence of image frames.

5. The image processing method of claim 4, wherein when the detection result indicates that the frame rate is less than a predetermined threshold, the step of performing the frame interpolation on the input sequence of image frames to generate the to-be-encoded sequence of image frames is performed.

6. The image processing method of claim 4, wherein when the detection result indicates that the frame rate is not less than a predetermined threshold, the step of performing the frame interpolation on the input sequence of image frames to generate the to-be-encoded sequence of image frames is not performed, and the input sequence of image frames is provided as the to-be-encoded sequence of image frames.

7. The image processing method of claim 1, wherein when the detection result indicates that the luminance is not less than a predetermined threshold, the step of performing the frame interpolation on the input sequence of image frames to generate the to-be-encoded sequence of image frames is not performed, and the input sequence of image frames is provided as the to-be-encoded sequence of image frames.

8. The image processing method of claim 1, wherein when the detection result indicates that the luminance is less than the predetermined threshold, the image processing method further comprises:
   generating a feedback signal that controls a shutter device in the image capturing device to decrease a shutter speed of the shutter device.

9. The image processing method of claim 1, wherein the detection result comprises a frame rate of the input sequence of image frames and a luminance of the input sequence of image frames.

10. The image processing method of claim 9, wherein when the detection result indicates that the frame rate is less than a first predetermined threshold and that the luminance is less than a second predetermined threshold, the step of performing the frame interpolation on the input sequence of image frames to generate the to-be-encoded sequence of image frames is performed.

11. The image processing method of claim 9, wherein when the detection result indicates that the frame rate is not less than a first predetermined threshold and that the luminance is not less than a second predetermined threshold, the step of performing the frame interpolation on the input sequence of image frames to generate the to-be-encoded sequence of image frames is not performed, and the input sequence of image frames is used as the to-be-encoded sequence of image frames.

12. An image processing apparatus, comprising:
a detection circuit capable of detecting an input sequence of image frames captured using an image capturing device to generate a detection result indicating whether or not to perform frame interpolation on the input sequence of image frames, the detection circuit also capable of generating the detection result based on an exposure time of the image capturing device;
a frame interpolation circuit, coupled to the detection circuit, the frame interpolation circuit arranged for referring to the detection result to selectively perform frame interpolation on the input sequence of image frames to generate a to-be-encoded sequence of image frames; and
a video encoder circuit capable of encoding the to-be-encoded sequence of image frames to generate an encoded video signal,
wherein the detection result comprises a luminance of the input sequence of image frames, and
wherein when the detection result indicates that the luminance is less than a predetermined threshold, the frame interpolation circuit performs the frame interpolation on the input sequence of image frames to generate the to-be-encoded sequence of image frames.

13. The image processing apparatus of claim 12, wherein when the frame interpolation circuit does not perform the frame interpolation on the input sequence of image frames, the input sequence of image frames is provided as the to-be-encoded sequence of image frames.

14. The image processing apparatus of claim 12, wherein when the frame interpolation circuit performs the frame interpolation on the input sequence of image frames, the to-be-encoded sequence of image frames comprises the input sequence of image frames and an additional sequence of image frames generated by the frame interpolation.

15. The image processing apparatus of claim 12, wherein the detection result comprises a frame rate of the input sequence of image frames.

16. The image processing apparatus of claim 15, wherein when the detection result indicates that the frame rate is less than a predetermined threshold, the frame interpolation circuit performs the frame interpolation on the input sequence of image frames to generate the to-be-encoded sequence of image frames.

17. The image processing apparatus of claim 15, wherein when the detection result indicates that the frame rate is not less than a predetermined threshold, the frame interpolation circuit does not perform the frame interpolation on the input sequence of image frames, and the input sequence of image frames is provided as the to-be-encoded sequence of image frames.

18. The image processing apparatus of claim 12, wherein when the detection result indicates that the luminance is not less than a predetermined threshold, the frame interpolation circuit does not perform the frame interpolation on the input sequence of image frames, and the input sequence of image frames is provided as the to-be-encoded sequence of image frames.

19. The image processing apparatus of claim 12, wherein when the detection result indicates that the luminance is less than the predetermined threshold, the frame interpolation circuit further generates a feedback signal that controls a shutter device in the image capturing device to decrease a shutter speed of the shutter device.

20. The image processing apparatus of claim 12, wherein the detection result comprises a frame rate of the input sequence of image frames and a luminance of the input sequence of image frames.

21. The image processing apparatus of claim 20, wherein when the detection result indicates that the frame rate is less than a first predetermined threshold and that the luminance is less than a second predetermined threshold, the frame interpolation circuit performs the frame interpolation on the input sequence of image frames to generate the to-be-encoded sequence of image frames.

22. The image processing apparatus of claim 20, wherein when the detection result indicates that the frame rate is not less than a first predetermined threshold and that the luminance is not less than a second predetermined threshold, the frame interpolation circuit does not perform the frame interpolation on the input sequence of image frames, and the input sequence of image frames is provided as the to-be-encoded sequence of image frames.

23. An image processing apparatus, comprising:
a detection circuit capable of detecting an input sequence of image frames captured using an image capturing device to generate a detection result indicating whether or not to perform frame interpolation on the input sequence of image frames to adjust a frame rate of the input sequence of image frames, the detection circuit also capable of generating the detection result based on a luminance of the image capturing device;
a frame interpolation circuit, coupled to the detection circuit, the frame interpolation circuit arranged for referring to the detection result to selectively perform frame interpolation on the input sequence of image frames to generate a to-be-encoded sequence of image frames; and
a video encoder circuit capable of encoding the to-be-encoded sequence of image frames to generate an encoded video signal,
wherein the detection result comprises a luminance of the input sequence of image frames, and
wherein when the detection result indicates that the luminance is less than a predetermined threshold, the frame interpolation circuit performs the frame interpolation on the input sequence of image frames to generate the to-be-encoded sequence of image frames.

* * * * *